Patented Aug. 26, 1924.

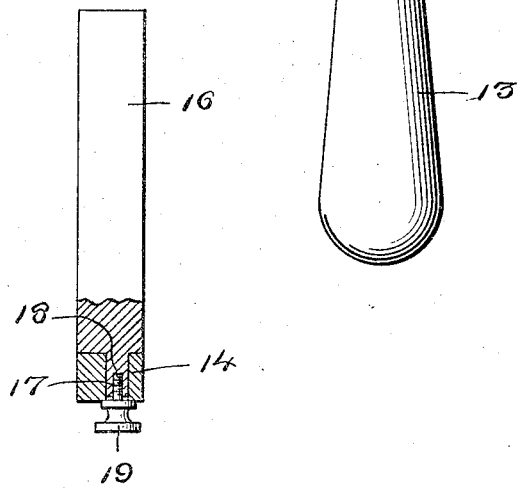

1,506,673

UNITED STATES PATENT OFFICE.

HERBERT W. SEABLOM, OF CHICAGO, ILLINOIS.

BATTERY-PLATE-BURNING GUIDE.

Application filed April 18, 1923. Serial No. 633,038.

*To all whom it may concern:*

Be it known that I, HERBERT W. SEABLOM, a citizen of the United States, residing at Chicago, in the county of Cook and State of Illinois, have invented new and useful Improvements in Battery-Plate-Burning Guides, of which the following is a specification.

This invention relates to special tools and has for its object the provision of a novel tool for use by storage battery workers engaged in building or repairing storage batteries, this tool being an adjustable guide used in "burning" the groups of plates in a storage battery.

I am well aware of the fact that guides for this purpose have been used and are on the market, but these guides are put out in sets, generally of five, the different tools in each set being capable of employment on groups of plates having a different number of plates in each group, for instance a tool used for burning in a group of seven plates is of an entirely different size from the tool used in connection with a group of thirteen plates, other tools being used for the intermediate sizes in exactly the same manner.

With the above facts in view I have designed the present burning guide which is adjustable for use on groups of plates ranging from seven to nineteen, the tool consequently taking the place of seven of those which are ordinarily used while being an improvement thereover in general design.

Another object is the provision of a tool of this character in which the gage arms are slidably mounted with respect to the supporting base or cross member, which cross member is calibrated whereby to regulate the size accurately.

With the above and other objects and advantages in view the invention consists in the details of construction to be hereinafter more fully described and claimed and illustrated in the accompanying drawings, in which:

Figure 1 is a perspective view of the device and

Figure 2 is a cross section taken through one of the slots.

Referring more particularly to the drawings the main supporting element of base of the device is an elongated bar 10 formed centrally with a threaded hole 11 receiving the threaded end of a shank 12 carried by a suitable handle 13. The bar 10 has its opposite end portion formed with elongated slots 14 which terminate short of the outer ends. In the present instance I have shown the outer ends of the slots 14 as closed by small plates 15 which are of slightly greater size than the cross sectional configuration of the bar so as to project slightly beyond the faces thereof. These plates may be secured to the ends of the bar by any desired means and this detail is of no consequence.

The numeral 16 designates the adjustable arms which are of rectangular shape in cross section and which are formed at one end with reduced extensions 17 slidably engaged within the slots 14. These ends of the arms are also formed with threaded holes 18 which receive clamping screws 19 which, when tightened, will hold the arms secure at any desired adjusted position.

One side of the bar 10 is calibrated by being provided with transverse scores 20 adjacent which are inscribed numbers which correspond to the number of storage battery plates in the group, depending upon the make and capacity of the battery. The arms 16 are inscribed with lines or scores 21 adapted to be brought into registration with the scores 20 for ascertaining a correct adjusted position of the arms depending upon the number of plates in the group to be burned.

In the use of the device, it is apparent that it is employed during the operation of "burning" together groups of plates to form a unit in the construction of storage batteries, the purpose of the device being to block the lead strap when the plates are being "burned" to it so as to prevent the lead from running over. The guide is placed on the burning rack in the same manner as the well known stationary guide or other device, and replaces the small pieces of one-fourth by four inch iron frequently if not commonly used as a make shift by battery men. The device is a great time saver over the old method inasmuch as it is adjustable and can be used on any group of plates ranging from seven to nineteen in number.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A guide of the character described comprising an elongated supporting bar provided with a handle, and a pair of jaws arranged in spaced parallel relation and slidably adjustable along said bar, the bar being formed with slots, and said jaws being formed with reduced extensions fitting within said slots, said extensions being formed with threaded holes, and clamping screws passing through the slots and engaged within said holes, the jaws being intended for straddling engagement upon a group of a selected number of storage battery plates.

In testimony whereof I affix my signature.

HERBERT W. SEABLOM.